United States Patent
Clayton et al.

(10) Patent No.: US 11,602,475 B2
(45) Date of Patent: Mar. 14, 2023

(54) SURGICAL TABLES

(71) Applicant: Eschmann Holdings Limited, Lancing (GB)

(72) Inventors: Matthew Clayton, Lancing (GB); John Trewin, Lancing (GB)

(73) Assignee: Steris Solutions Limited, Leicester (GB)

( * ) Notice: Subject to any disclaimer, the term of this patent is extended or adjusted under 35 U.S.C. 154(b) by 19 days.

(21) Appl. No.: 16/642,966

(22) PCT Filed: Aug. 31, 2018

(86) PCT No.: PCT/EP2018/073456
§ 371 (c)(1),
(2) Date: Feb. 28, 2020

(87) PCT Pub. No.: WO2019/043150
PCT Pub. Date: Mar. 7, 2019

(65) Prior Publication Data
US 2020/0188207 A1    Jun. 18, 2020

(30) Foreign Application Priority Data

Sep. 4, 2017  (GB) ..................................... 1714131
Sep. 4, 2017  (GB) ..................................... 1714135
(Continued)

(51) Int. Cl.
*A61G 13/04*   (2006.01)
*A61G 13/06*   (2006.01)

(52) U.S. Cl.
CPC ............. *A61G 13/04* (2013.01); *A61G 13/06* (2013.01); *A61G 2203/12* (2013.01)

(58) Field of Classification Search
CPC .......... A47B 9/20; A61G 13/04; A61G 13/06; A61G 2203/12
See application file for complete search history.

(56) References Cited

U.S. PATENT DOCUMENTS 2,816,806 A    12/1957 Zaalberg
3,868,103 A  *  2/1975 Pageot ................... A61G 13/02
                                                              5/614
(Continued)

FOREIGN PATENT DOCUMENTS

CN    2409954       12/2000
CN    2409954 Y  *  12/2000
(Continued)

OTHER PUBLICATIONS

International Preliminary Report on Patentability issued in corresponding international application No. PCT/EP2018/073456 dated Mar. 10, 2020.
(Continued)

*Primary Examiner* — David R Hare
*Assistant Examiner* — Alexis Felix Lopez
(74) *Attorney, Agent, or Firm* — Polsinelli, P.C.

(57) ABSTRACT

A surgical table having a tabletop to be rotatable about a trend axis, the trend axis extending in a transverse direction across the tabletop; and an actuator mechanism coupled to the movable framework and arranged to raise and lower the movable framework relative to the column and to raise and lower the trend axis and to rotate the movable framework about the trend axis, and a control mechanism arranged to control the actuator mechanism to cause (i) the height of the trend axis to be translationally variable within a first dimensional range having a lowermost position, at which the trend axis extends through the column, and an uppermost position, at which the trend axis is above the upper end of the column the trend axis and is spaced at spacing height above the upper end of the column, and, simultaneously and/or independently (ii) the location of the trend axis in a lateral direction orthogonal to the trend axis to be translationally (Continued)

variable within a second dimensional range extending between first and second end positions.

31 Claims, 11 Drawing Sheets

(30) Foreign Application Priority Data

| Sep. 4, 2017 | (GB) | 1714137 |
|---|---|---|
| Sep. 4, 2017 | (GB) | 1714138 |
| Sep. 4, 2017 | (GB) | 1714140 |
| Sep. 4, 2017 | (GB) | 1714143 |
| Jan. 23, 2018 | (GB) | 1801096 |

(56) References Cited

U.S. PATENT DOCUMENTS

| 5,208,928 | A | 5/1993 | Kuck et al. | |
|---|---|---|---|---|
| 5,398,356 | A | 3/1995 | Pfleger | |
| 6,681,423 | B2 * | 1/2004 | Zachrisson | A61G 13/04 5/601 |
| 8,424,133 | B1 * | 4/2013 | Rossi | A61B 6/0487 5/601 |
| 9,849,054 | B2 * | 12/2017 | Jackson | A61G 13/02 |
| 10,206,841 | B2 * | 2/2019 | Soltermann | A61G 13/04 |
| 10,888,483 | B2 * | 1/2021 | Ostyn | A61G 13/121 |
| 2002/0050112 | A1 | 5/2002 | Koch et al. | |
| 2003/0074735 | A1 | 4/2003 | Zachrisson | |
| 2004/0098804 | A1 * | 5/2004 | Varadharajulu | A61G 13/04 5/611 |
| 2007/0107126 | A1 * | 5/2007 | Koch | A61G 13/02 5/600 |
| 2012/0216350 | A1 | 8/2012 | Revenus | |
| 2013/0111666 | A1 | 5/2013 | Jackson | |
| 2015/0135438 | A1 | 5/2015 | Marugg | |
| 2015/0290058 | A1 | 10/2015 | Panzer | |
| 2016/0000620 | A1 * | 1/2016 | Koch | A61G 7/008 5/608 |
| 2017/0000676 | A1 | 1/2017 | Revenus | |
| 2018/0193216 | A1 * | 7/2018 | Soltermann | A61G 13/04 |

FOREIGN PATENT DOCUMENTS

| DE | 2260140 | | 6/1974 | | |
|---|---|---|---|---|---|
| DE | 2260140 | A1 * | 6/1974 | | A61G 13/02 |
| DE | 102014104681 | A1 * | 10/2015 | | A61G 13/06 |
| DE | 102014109375 | A1 * | 1/2016 | | A61G 7/005 |
| DE | 102015005749 | A1 | 1/2016 | | |
| DE | 102017223076 | A1 * | 7/2018 | | A61G 13/06 |
| EP | 0691118 | A2 * | 1/1996 | | A61G 13/02 |
| EP | 1785121 | A2 | 5/2007 | | |
| EP | 1434547 | B1 | 11/2012 | | |
| EP | 2873406 | A1 * | 5/2015 | | A61G 13/06 |
| EP | 2962673 | A1 * | 1/2016 | | A61G 13/06 |
| GB | 181836 | | 4/1937 | | |
| HU | 212376 | B | 12/1992 | | |
| HU | 212376 | B * | 6/1996 | | |
| JP | S4715493 | | 10/1972 | | |
| JP | H07194662 | | 8/1995 | | |
| JP | 2004216022 | A | 8/2004 | | |
| JP | 2017079891 | | 5/2017 | | |
| WO | 2001032054 | A1 | 5/2001 | | |
| WO | 200172226 | A1 | 10/2001 | | |
| WO | 2002058615 | A2 | 8/2002 | | |
| WO | 2003030802 | A2 | 4/2003 | | |
| WO | WO-03030802 | A2 * | 4/2003 | | A61G 13/06 |
| WO | WO-2013058806 | A1 * | 4/2013 | | A61G 13/04 |
| WO | WO-2015150535 | A1 * | 10/2015 | | A61G 13/06 |

OTHER PUBLICATIONS

Examination Report under Section 18(3) in related GB Application No. 1714138.3 dated Aug. 6, 2019.
Combined Search and Examination Report under Sections 17 and 18(3) in related GB Application No. 1714138.3 dated Mar. 6, 2018.
Combined Search and Examination Report Under Sections 17 and 18(3) in related GB Application No. 1714131.8 dated Mar. 6, 2018.
Examination Report under Section 18(3) in related GB Application No. 1714135.9 dated Aug. 6, 2019.
Combined Search and Examination Report Under Sections 17 and 18(3) in related GB Application No. 1714135.9 dated Mar. 6, 2018.
Examination Report under Section 18(3) in related GB Application No. 1714137.5 dated Aug. 6, 2019.
Combined Search and Examination Report Under Sections 17 and 18(3) in related GB Application No. 1714137.5 dated Mar. 6, 2018.
Combined Search and Examination Report Under Sections 17 and 18(3) in related GB Application No. 1714140.9 dated Mar. 6, 2018.
Combined Search and Examination Report Under Sections 17 and 18(3) in related GB Application No. 1714143.3 dated Mar. 6, 2018.
Examination Report Under Section 18(3) in related GB Application No. 1801096.7 dated Aug. 6, 2019.
Combined Search and Examination Report Under Sections 17 and 18(3) in related GB Application No. 1801096.7 dated Jul. 5, 2018.
International Search Report and Written Opinion in related PCT Application No. PCT/EP2018/073456 dated Dec. 14, 2018.
Examination Report Under Section 18(3) in related GB Application No. 1814164.8 dated Aug. 6, 2019.
Combined Search and Examination Report Under Sections 17 and 18(3) in related GB Application No. 1814164.8 dated Oct. 1, 2018.
Combined Search and Examination Report Under Sections 17 and 18(3) in related GB Application No. 1814178.8 dated Oct. 1, 2018.
Combined Search and Examination Report Under Sections 17 and 18(3) in related GB Application No. 1814161.4 dated Oct. 1, 2018.
Examination Report Under Section 18(3) in related GB Application No. 1814176.2 dated Aug. 6, 2019.
Combined Search and Examination Report Under Sections 17 and 18(3) in related GB Application No. 1814176.2 dated Oct. 1, 2018.

* cited by examiner

SURGICAL TABLES

FIELD OF THE INVENTION

The present invention relates to surgical tables.

BACKGROUND

Surgical tables, or operating tables, comprising a base for standing on a floor, a column extending from the base, and a tabletop providing a patient support surface are well known. There is a general need in the art for surgical tables to have variable height to enable the tabletop to be located at a selected height which is most suitable for the required surgical, therapeutic or diagnostic treatment of a patient positioned on the surgical table. The column is extendable, typically by a telescoping arrangement, to allow the column to be moved between contracted and extended positions in order to lower and/or raise the tabletop to a desired height.

Still further, the tabletop of the surgical table is generally required to be movable relative to the column so as to be tiltable about two orthogonal horizontal axes, namely a tilt axis extending longitudinally along the length of the tabletop and a trend (Trendelenburg) axis extending transversely across the length of the tabletop.

The structure of the tabletop and the column, and of the actuator mechanisms to move the tabletop relative to the column about the tilt axis and/or the trend axis, must enable free movement about the tilt axis and/or the trend axis over a wide range of tilt/trend angles, and over a wide range of table operating heights.

Surgical tables currently on the market rotate the tabletop about a fixed axis of rotation, which is normally located above the column. Typically, the surgical site of the patient to be operated on by the surgeon is not above the column. Even if the surgical site is above the column, the fixed axis of rotation is below the surgical site. Consequently, when the Trendelenburg (or reverse Trendelenburg) movement is applied to the surgical table, the position of the surgical site is translated in three-dimensional (3-D) space. This in turn requires re-adjustment of any other apparatus used in the surgical procedure that is not fixed to the tabletop, and further adjustment of the table to re-position the surgical site to the desired height to continue the surgical procedure.

SUMMARY OF THE INVENTION

There is a need in the art to provide a surgical table which can reduce, minimise or avoid the need for adjustment or compensatory movement of the surgical table or associated surgical apparatus as a result of Trendelenburg (or reverse Trendelenburg) movement applied to the surgical table.

The present invention aims at least partially to meet this need in the art.

The present invention provides a surgical table. Optional and/or preferred features are defined in the various embodiments.

BRIEF DESCRIPTION OF THE DRAWINGS

Preferred embodiments of the present invention will now be described by way of example only with reference to the accompanying drawings, in which.

DETAILED DESCRIPTION

Referring to FIGS. 1 to 10, a surgical table, designated generally as 2, comprises a base 4 or standing on a floor. The base 4 typically includes wheels for moving the table 2 along the floor. Alternatively, the base 4 may be fixed, for example having fixed feet. A column 6 of adjustable height is mounted on and extends from the base 4. A tabletop 8, which provides a patient support surface 10, is supported above the column 6.

As described hereinafter, the surgical table 2 includes a mechanism for inclining the tabletop 8 relative to the column 6 by inclining the tabletop 8 about transverse and longitudinal horizontal axes of the tabletop 8. Inclination about the transverse horizontal axis of the tabletop 8 in a Trendelenburg (or reverse Trendelenburg) movement is referred to in the art as "trending", while inclination about the longitudinal horizontal axis of the tabletop 8 is referred to as "tilting". Compound movements also are possible, in which the tabletop 8 is inclined about both the transverse and longitudinal axes of the tabletop 8 at the same time.

As used herein, the longitudinal axis of the tabletop 8 is the major axis of the tabletop 8 and the transverse axis of the tabletop 8 is the orthogonal minor axis of the tabletop 8. The longitudinal direction of the tabletop 8 is parallel to the major axis and the transverse direction of the tabletop 8 is parallel to the minor axis. That is, the transverse direction of the tabletop 8 is perpendicular to, or orthogonal to, the longitudinal direction of tabletop 8.

Figure 1:
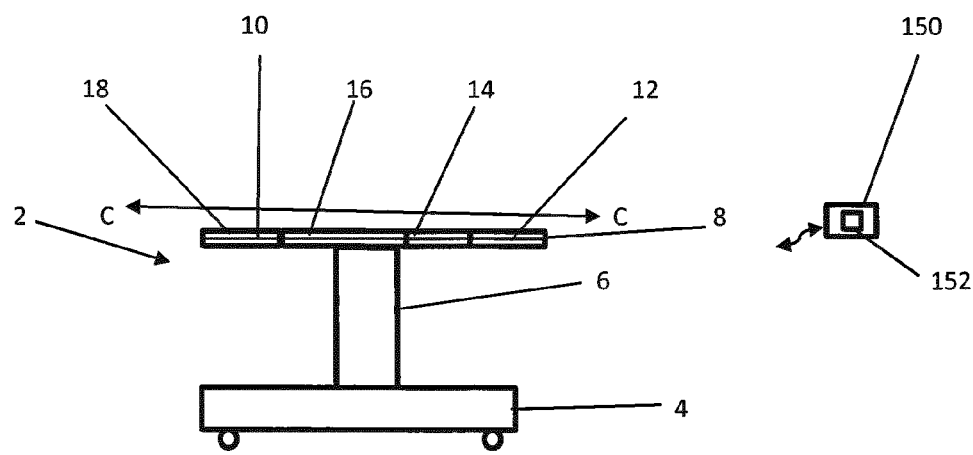
FIG. 1 is a schematic side view of a surgical table in accordance with an embodiment of the present invention.

As depicted in FIG. 1, the tabletop 8 is typically divided into five sections, namely a head section 12, an upper torso section 14, a lower torso section 16 and a pair of laterally adjacent leg sections 18, of which only one is shown in FIG. 1. The lower torso section 16 is coupled to the column 8. Each of the sections of the tabletop 8 provides a portion of the patient support surface 10, and each of the sections has a respective separate mattress (not illustrated) removably fitted to the respective section. As is well known in the art, the tabletop sections can be individually moved relative to an adjacent section and some sections can be detached from the tabletop 8.

Figure 6:
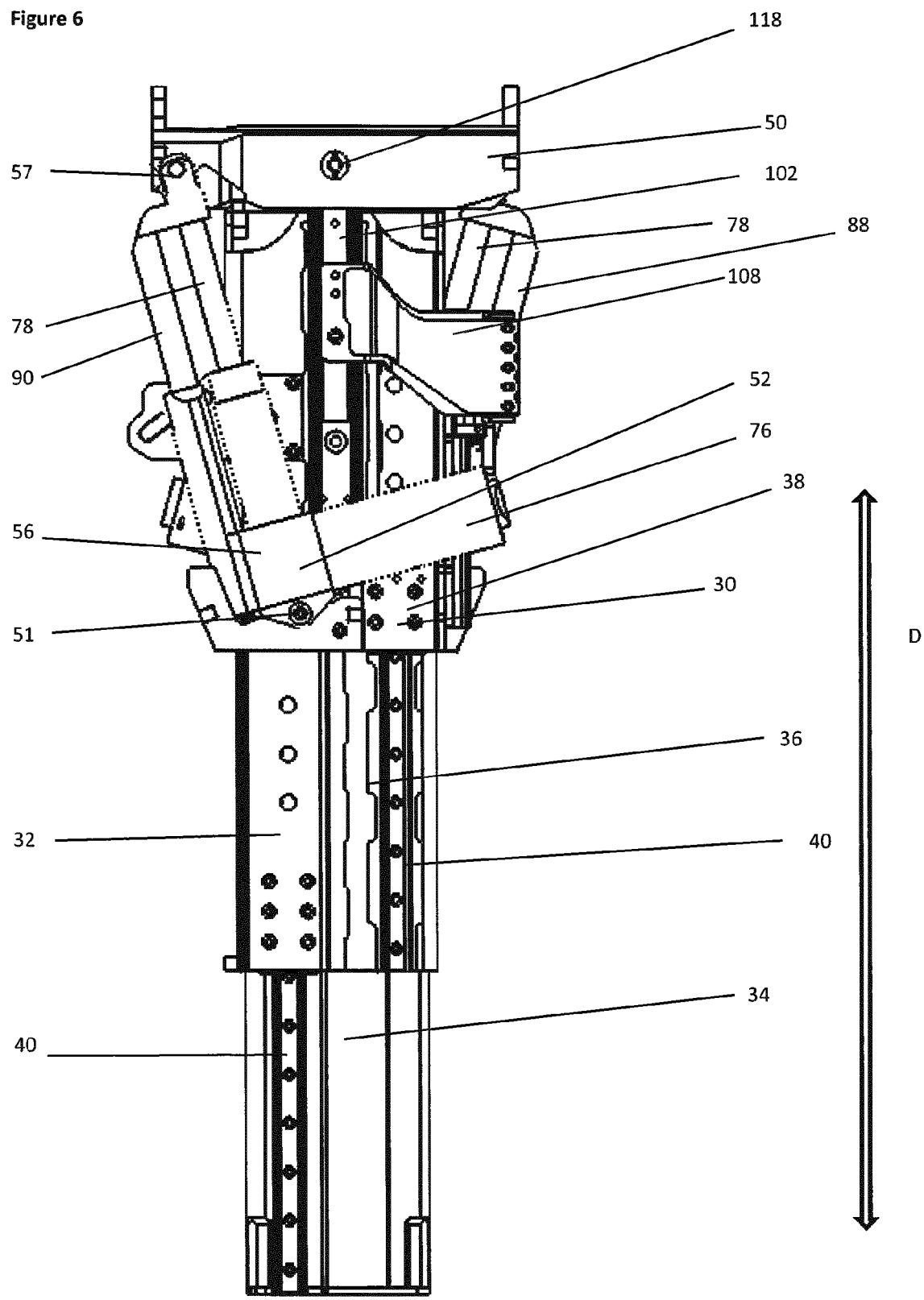
FIG. 6 is a schematic side view of the column and the mechanism for controlling the trend angle and height of the trend frame of the surgical table of FIG. 1, showing the column at maximum height and the trend frame at maximum height.

Referring in particular to FIG. 6, the column 6 comprises a plurality of column elements 30, 32, 34 which form a telescoping assembly 36. The telescoping assembly 36 surrounds an actuator (not shown) for raising and lowering the column 6. The plurality of column elements comprises an outer column element 30 and an inner column element 34. The outer column element 30 externally surrounds the inner column element 34 and defines an external surface 38 of the column 6 when the column elements 30, 32, 34 are telescoped into a contracted configuration. The plurality of column elements further comprises at least one intermediate column element 32 between the outer column element 30 and the inner column element 34. In the illustrated embodiment there is only one intermediate column element 32, although a telescoping series of plural intermediate column elements 32 may be provided.

The actuator typically comprises an electric actuator coupled between the outer column element 30 and the base 4 and drives the outer column element 30 upwardly and downwardly relative to the base 4, with the plurality of column elements 30, 32, 34 being coupled together so as to be raised or lowered in synchronism. Position sensors and high/low limit switches may be provided on the column 6. End stops may be provided to limit the high/low positions of the plurality of column elements.

The column 6 comprises a plurality of linear motion guide units 40 between each pair of adjacent column elements 30, 32, 34. The linear motion guide units 40 are recirculating ball-type linear guides.

As shown particularly in FIGS. 2a to 8c, the surgical table 2 incorporates a mechanism for controlling the trend angle and height of a trend frame 50 in the form of a movable framework 50, which is beneath the tabletop 8. The trend frame 50 can be rotated about a trend axis, and the angle of inclination of the trend frame 50 sets the trend angle of the tabletop 8.

The movable framework 50, constituting the trend frame 50, is mounted between the tabletop 8 and the column 6. The movable framework 50 enables at least a part of the tabletop 8, for example the lower torso section 16, to be rotatable about the trend axis T-T. The trend axis T-T extends through the movable framework 50 in a transverse direction across the tabletop 8. The tilt axis X-X extends through the movable framework 50 and is orthogonal to the trend axis T-T. The tilt axis X-X is parallel to a central longitudinal axis C-C of the tabletop 8.

Figure 2A:
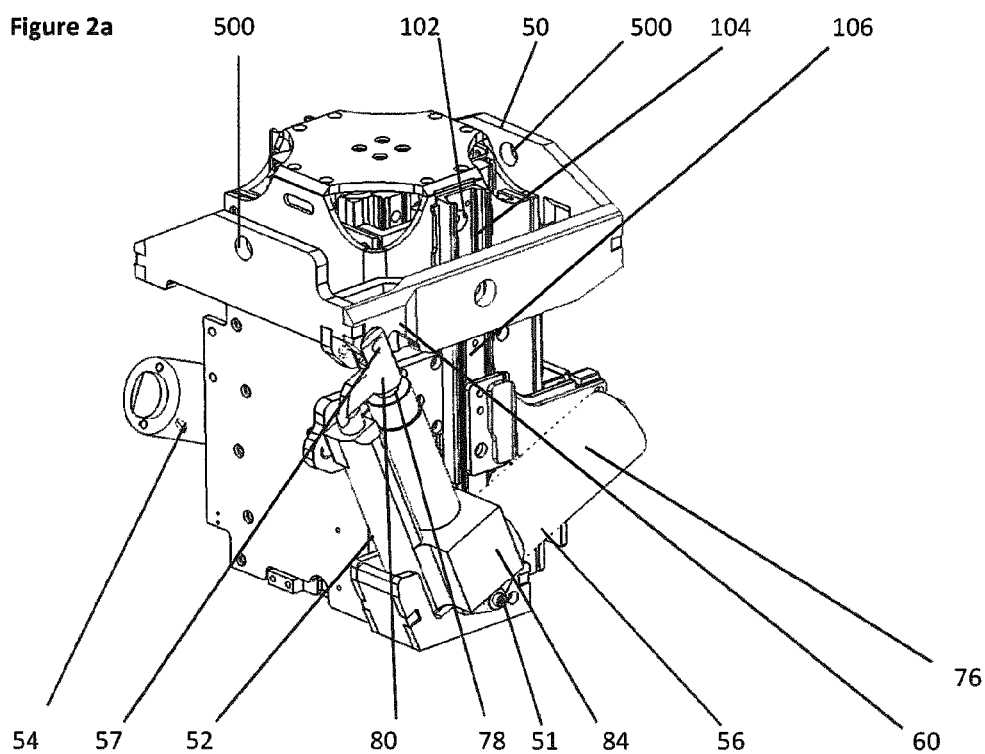
FIGS. 2a and 2b are each is a schematic perspective side view from above of the column and a mechanism for controlling the trend angle and height of a trend frame of the surgical table of FIG. 1, respectively showing the column at minimum height and the trend frame at minimum height and the column at minimum height and the trend frame at maximum height.

The trend frame 50, provided by the movable framework 50, is adapted to move about the trend axis T-T, and a tilt frame (not shown) is mounted above the movable framework 50 at the pivot points 500 shown in FIG. 2a to enable the tilt frame to move independently by a separate drive system (not shown) about the tilt axis X-X. Various drive systems for such a tilt frame are known to those skilled in the art. The lower surface of the tabletop 8 is directly fitted to the tilt frame. The tilt frame is located above the trend axis T-T.

Accordingly, movement of the movable framework 50 about the trend axis T-T, or when the trend axis T-T is translated upwardly or downwardly, causes corresponding movement of the tabletop 8 which is fitted to the tilt frame carried by the trend frame 50, provided by the movable framework 50, and the tilt frame can further impart additional tilting motion and positioning to the tabletop 8.

An actuator mechanism 52 is coupled to the movable framework 50 and arranged to raise and lower the movable framework 50 relative to the column 6 and to rotate the movable framework 50 about the trend axis T-T. The actuator mechanism 52 is external of the column 6.

The actuator mechanism 52 comprises first and second actuators 54, 56. The first actuator 54 is connected by a first pivot coupling 55 to a first portion 58, preferably located at one end, of the movable framework 50 and the second actuator 56 is connected by a second pivot coupling 57 to a second portion 60, preferably located at an opposite end, of the movable framework 50. The first and second pivot couplings 55, 57 have respective pivot axes which are mutually spaced and parallel. The first and second portions 58, 60 are mutually spaced and located on opposite sides of the trend axis T-T and on opposite sides of the tilt axis X-X. The movable framework 50 is substantially rectangular and the first and second portions 58, 60 are located at diagonally opposite corners 62, 64 of the movable framework 50. The movable framework 50 has a rigid frame having opposite first and second end portions 58, 60 mutually spaced a fixed distance.

In the embodiment, the first and second actuators 54, 56 are the only actuators coupled between the column 6 and the movable framework 50 for causing movement of the movable framework 50 relative to the column 6.

The first actuator 54 has an upper first end 66 connected to the first portion 58 of the movable framework 50. The first actuator 54 has a lower second end 68 coupled, directly or indirectly, to the column 6. The second actuator 56 has an upper first end 70 connected to the second portion 60 of the movable framework 50 and a lower second end 72 coupled, directly or indirectly, to the column 6. In the preferred embodiment, the second end 68, 72 of each of the first and second actuators 54, 56 is coupled to the external surface 38 of the column 6.

The first and second actuators 54, 56 each comprise an electrical linear actuator 76, which comprises an elongate element 78 having an upper end 80 connected by a respective pivot coupling 55, 57 to the movable framework 50 and a drive assembly 84 for extending, or retracting, the elongate element 78 so as respectively to raise, or lower, the respective first and second portions 58, 60 of the movable framework 50.

In the illustrated embodiment, the elongate element 78 comprises a leadscrew 86 and the drive assembly 84 is adapted to rotate the leadscrew 86 to extend, or retract, the leadscrew 86 so as respectively to raise, or lower, the respective first and second portions 58, 60 of the movable framework 50.

In an alternative embodiment, the elongate element 78 may comprise a hydraulically operated piston. Any other type of actuator may be used that is suitable to raise, or lower, the respective first and second portions 58, 60 of the movable framework 50. The present invention is not limited to any particular drive mechanism for the first and second actuators 54, 56.

First and second stabilisers 88, 90 are also provided. Each first and second stabiliser 88, 90 is associated with a respective one of the first and second actuators 54, 56. However, in a modified embodiment only one of the actuators is provided with a stabiliser.

The drive assembly 84 of each first and second actuator 54, 56 is pivotally connected to the column 6 by a pivot mount 51. Therefore each of the first and second actuators 54, 56, including a respective electrical linear actuator 76, elongate element 78, and drive assembly 84, and a respective one of the first and second stabilisers 88, 90, is rotatable about the respective pivot mount 51.

The first and second actuators 54, 56 can be operated independently so as to be driven in the same or opposite directions and at the same or different speeds. Therefore the rotational orientation of the first and second actuators 54, 56 about the respective pivot mount 51 can be different.

The first and second actuators 54, 56, and correspondingly the respectively associated first and second stabiliser 88, 90, are not oriented in a geometrically vertical orientation, i.e. aligned with the direction of orientation of the column 6, but instead are inclined to the vertical, i.e. aligned to the direction of orientation of the column 6.

The elongate element 78 is linear and is inclined at an acute angle from a plane including a longitudinal axis of the column 6 and the trend axis T-T so that the upper end 80 is oriented further from the plane than a lower portion 85 of the elongate element 78. The elongate elements 78 of the first and second actuators 54, 56 are oriented in opposite directions from the plane. The acute angle of inclination of each elongate element 78 from the plane decreases as the extension of the elongate element 78 increases.

When the first or second actuator 54, 56 is configured so that the respective leadscrew 86 is fully retracted, so as to lower the respective first or second portion 58, 60 of the movable framework 50, first or second actuator 54, 56 is in a first pivot position in which the leadscrew 86 is oriented at a relatively large acute angle (for example 13 to 25°) relative to the vertical, i.e. the direction of orientation of the column 6, the angle also being dependent upon the height of the other actuator.

Alternatively, when the first or second actuator 54, 56 is configured so that the respective leadscrew 86 is fully extended, so as to raise the respective first or second portion 58, 60 of the movable framework 50, first or second actuator 54, 56 is in a second pivot position in which the leadscrew 86 is extended and at a relatively small acute angle (for example 8 to 16°) relative to the vertical, i.e. the direction of orientation of the column 6, the angle also being dependent upon the height of the other actuator.

When the first and second actuators 54, 56 are both fully retracted, each leadscrew 86 is oriented at an acute angle of from 20 to 25° relative to the vertical. When the first and second actuators 54, 56 are both fully extended, each leadscrew 86 is oriented at an acute angle of from 12 to 18° relative to the vertical. When one of the first and second actuators 54, 56 is fully extended and the other of the first and second actuators 54, 56 is fully retracted, the extended leadscrew 86 is oriented at an acute angle of from 5 to 10° relative to the vertical and the retracted leadscrew 86 is oriented at an acute angle of from 11 to 15° relative to the vertical.

The movable framework 50 defines an internal opening 98 which is larger than an upper end 100 of the column 6. The actuator mechanism 52 is capable of lowering the movable framework 50 relative to the column 6 to a lowermost position in which the movable framework 50 is below the upper end 100 of the column 6 and annularly surrounds the column 6. In the lowermost position the trend axis T-T is below the upper end 100 of the column 6, and extends through an upper part of the outer column element 30 which surrounds the inner column element 34 when the column elements 30, 32, 34 are telescoped into the contracted configuration, and typically the movable framework 50 is entirely below the upper end 100 of the column 6.

The actuator mechanism 52 is capable of raising the movable framework 50 relative to the column 6 to an uppermost position in which the movable framework 50 is above the upper end 100 of the column 6. In the uppermost position the trend axis T-T is above the upper end 100 of the column 6, and is spaced by a spacing height from an uppermost part of the column 6, and typically the movable framework 50 is above, preferably entirely above, the upper end 100 of the column 6. The actuator mechanism 52 is fitted to the outer column element 30 and when the column elements 30, 32, 34 are telescoped into an extended configuration the actuator mechanism 52, the movable framework 50 and the tabletop 8 are raised relative to the base 4.

In the illustrated embodiment two linear guide mechanisms 102 are provided on opposite sides of the column 6. Each linear guide mechanism 102 extends along at least a part of the column 6. Each linear guide mechanism 102 comprises a first part 104 coupled to the column 6 and a second part 106 coupled to the movable framework 50. Each linear guide mechanism 102 comprises a respective pair of first and second parts 104, 106.

Figure 5:
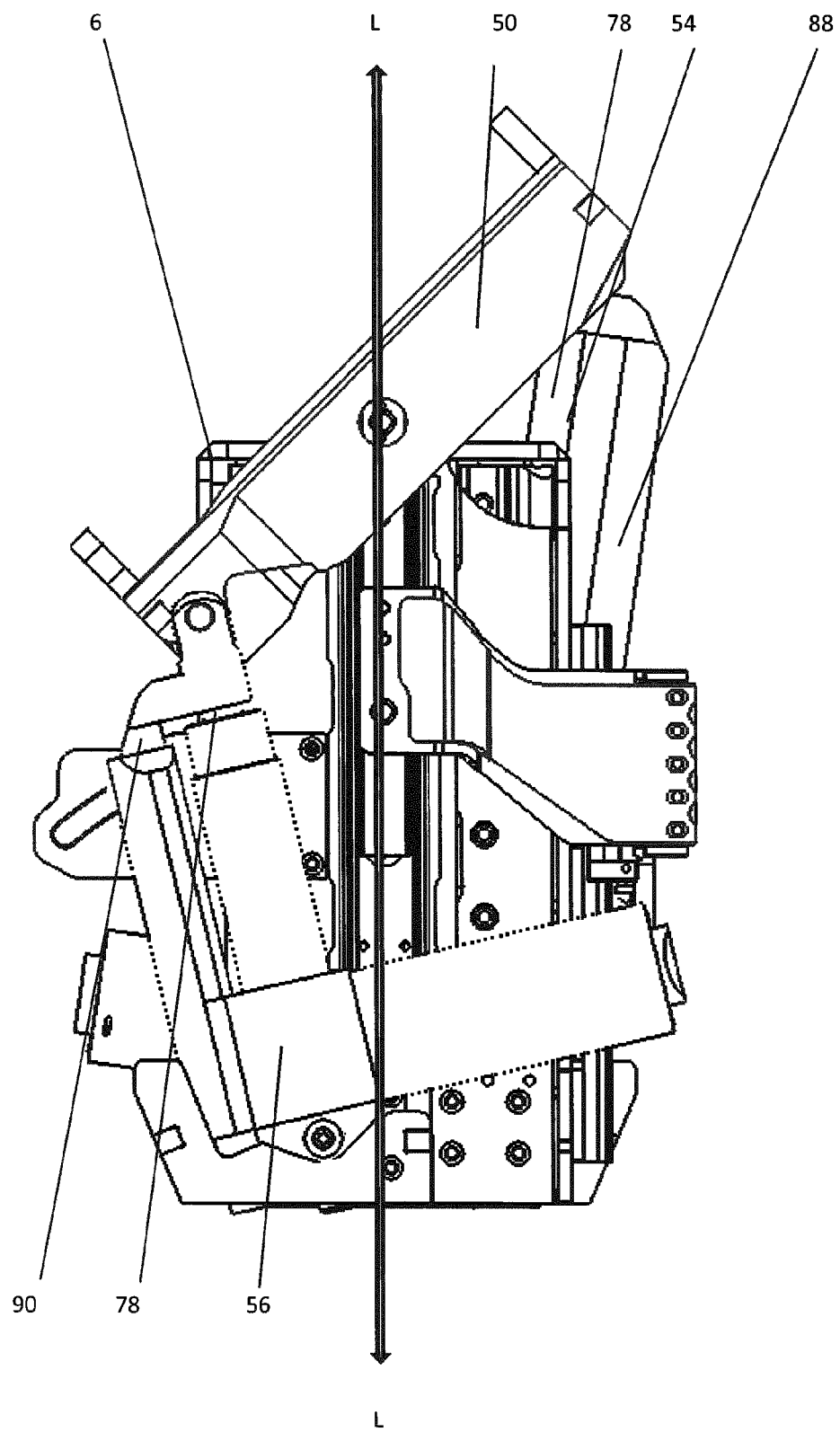
FIG. 5 is a schematic side view of the column and the mechanism for controlling the trend angle and height of the trend frame of the surgical table of FIG. 1, showing the column at minimum height and the trend frame at an intermediate height, and with the trend frame at a reverse trend angle of 45°.

The first and second parts 104, 106 are relatively movable along a linear axis L-L, shown in FIG. 5, of the linear guide mechanism 102 to enable the movable framework 50 to be translated along the linear axis L-L by relative movement of the first and second parts 104, 106. The first part 104 is a fixed linear guide member 110, fixed to the column 6, and the second part 106 is a movable linear guide member 112, coupled to the movable framework 50 at a trend pivot 118. The first part 104 is an elongate channel 114 and the second part 106 is an elongate slider 116 within the channel 114, although the opposite configuration may be employed.

In the illustrated embodiment, the two linear guide mechanisms 102 are raised or lowered synchronously with the raising or lowering of the trend pivots 118. The two linear guide mechanisms 102 ensure that the trend pivots 118 can only move vertically.

The actuator mechanism 52 is fitted to the external surface 38 of the outer column element 30. The linear guide mechanisms 102 are also fitted to the outer column element 30, in particular to the external surface 38 of the outer column element 30. When the column elements 30, 32, 34 are telescoped into an extended configuration, the linear guide mechanisms 102, and a brace mechanism 108 fitted between the elongate sliders 116, are raised relative to the base 4.

In the surgical table 2 of the illustrated embodiment, a lifting and orienting mechanism for the trend frame 50, which is movable framework 50, is fitted around the outside of the column. The lifting and orienting mechanism comprises the actuator mechanism 52, which in turn comprises the first and second actuators 54, 56. The first and second actuators 54, 56 can have a ballscrew or leadscrew construction.

Each respective electrical linear actuator 76 drives the respective elongate element 78 through a gearbox in the electrical linear actuator 76. The first and second actuators 54, 56 are positioned so that the trend frame 50 is supported on opposite sides of the column 6, each side extending transverse to the trend axis T-T and constituting a "front" or "rear" side of the column 6 as would be understood by those skilled in the art, at diagonally opposite corners of the trend frame 50.

The operation of the surgical table 2 will now be described.

As described above, the surgical table 2 incorporates a mechanism for controlling the trend angle and height of a trend frame 50, which is beneath the tabletop 8. The trend frame 50 can be rotated about a trend axis, and the angle of inclination of the trend frame 50 sets the trend angle of the tabletop 8. The height of the column 6 can be controlled independently from the height of the trend frame 50.

Figure 2B:
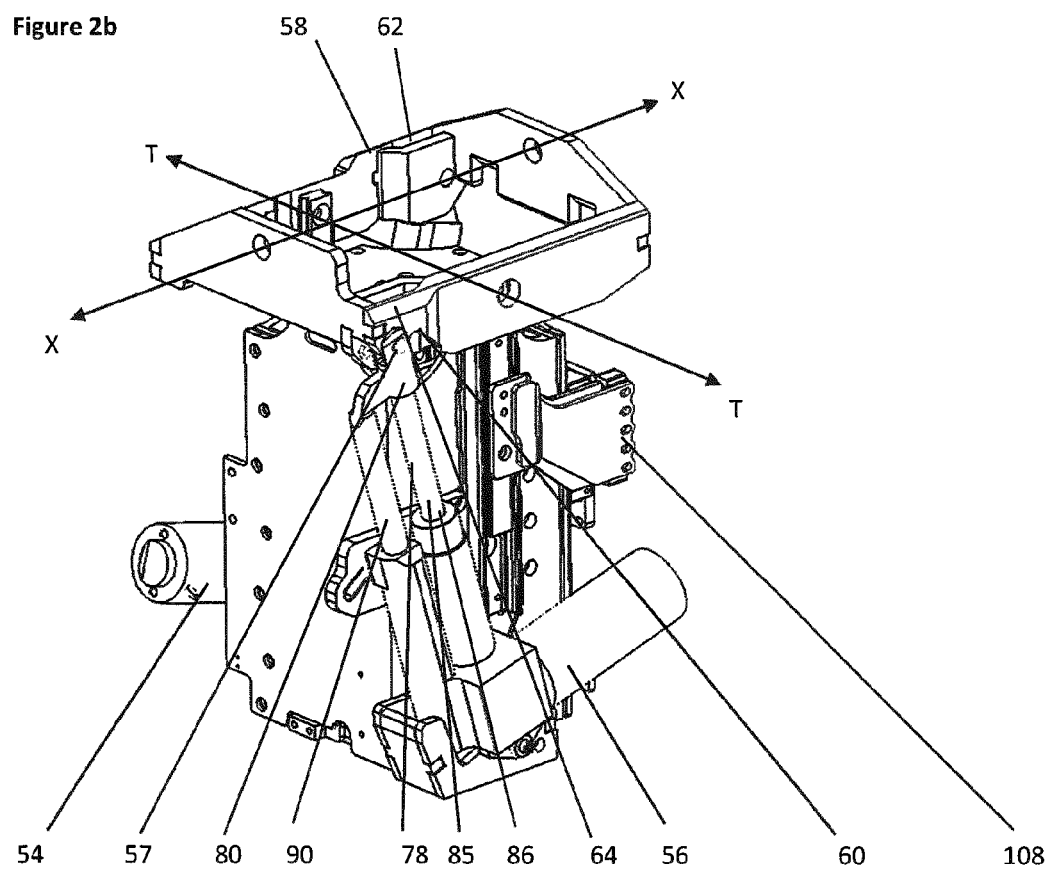
Figure 4:
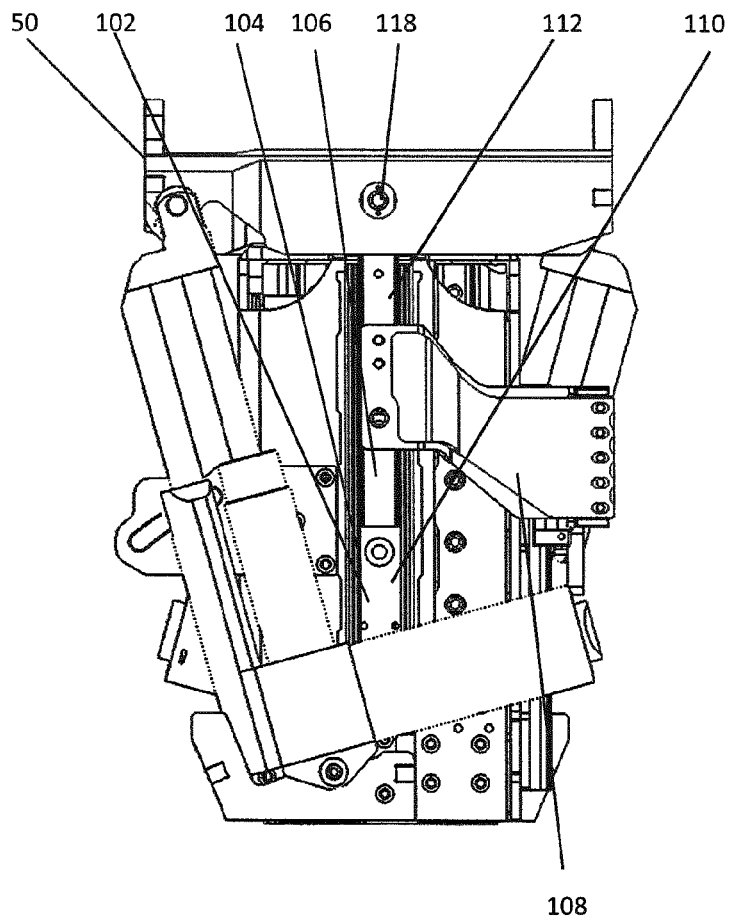
FIG. 4 is a schematic side view of the column and the mechanism for controlling the trend angle and height of the trend frame of the surgical table of FIG. 1, showing the column at minimum height and the trend frame at maximum height.

FIGS. 2b and 4 show the column 6 at minimum height and the movable framework 50, constituting the trend frame 50, at maximum height. In this configuration, the elongate elements 78 of the first and second actuators 54, 56 are fully extended, and the first and second stabilisers 88, 90 and the brace mechanism 108 prevent twisting of the movable framework 50 under the action of any applied load on the table 2.

The trend axis T-T is raised relative to the column 6. The movable framework 50 is raised relative to the column 6 to an uppermost position in which the movable framework 50 is above the upper end 100 of the column 6, the trend axis T-T is above the upper end 100 of the column 6, and the movable framework 50 is entirely above the upper end 100 of the column 6. The column elements 30, 32, 34 are telescoped into a contracted configuration. The movable framework 50 and the tabletop 8 are raised relative to the base 4 by the first and second actuators 54, 56.

In this configuration, the trend axis T-T is typically 410 mm above the bottom of the column 6 which is mounted on the base 4. This configuration could be used as a rest position for the surgical table 2.

When it is desired to lower the tabletop 8 even further, for example to transfer a patient onto or from the tabletop 8, the movable framework 50 can be lowered even further, which lowers the tabletop 8 supported thereby.

Figure 3:
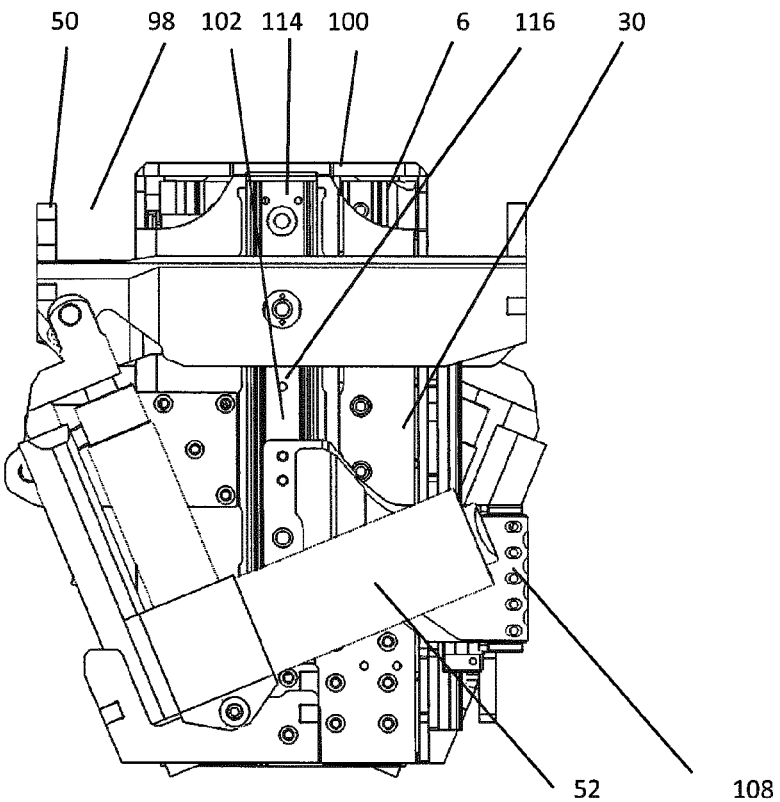
FIG. 3 is a schematic side view of the column and the mechanism for controlling the trend angle and height of the trend frame of the surgical table of FIG. 1, showing the column at minimum height and the trend frame at minimum height.

Accordingly, FIGS. 2a and 3 shows the column 6 at minimum height and the movable framework 50, constituting the trend frame 50, at minimum height. In this configuration, the elongate elements 78 of the first and second actuators 54, 56 are fully retracted.

The trend axis T-T is lowered relative to the column 6. The movable framework 50 is lowered relative to the column 6 to a lowermost position in which the movable framework 50 is below the upper end 100 of the column 6 and annularly surrounds the column 6. In the lowermost position the trend axis T-T is below the upper end 100 of the column 6 and extends through an upper part of the outer column element 30 and the movable framework 50 is entirely below the upper end 100 of the column 6.

In this configuration, the trend axis T-T is typically 280 mm above the bottom of the column 6 which is mounted on the base 4 and the column height is typically less than 380 mm above the base 4.

When it is desired to incline the tabletop at a trend angle, as shown in FIG. 5 the column 6 can be set at its minimum height, as described above, and the trend frame 50 can be set at an intermediate height, and with the trend frame 50 at a forward or reverse trend angle of up to 45°. The trend angle may be controlled by providing that one of the elongate elements 78 of the first and second actuators 54, 56 is retracted (in FIG. 5, second actuator 56) and the other of the elongate elements 78 of the first and second actuators 54, 56 (in FIG. 5, first actuator 54) is extended.

At the maximum trend angle of +45° or −45° (or even greater trend angle values) one of the elongate elements 78 of the first and second actuators 54, 56 is fully retracted and the other of the elongate elements 78 of the first and second actuators 54, 56 is fully extended. This provides a large range of trend angles, over an angular range of 90°, from endpoints of +45° to −45° even when the column 6 is fully retracted, and so the tabletop 8 is at a relatively low height, with the trend axis typically being no more than 410 mm above the base 4.

The above-described lifting and orienting mechanism for the trend frame 50 permits a number of different motions which can be control the first and second actuators 54, 56. The particular structural relationship between the first and second actuators 54, 56 and the trend frame 50 achieves a remarkable variety and range of motions of the trend frame 50.

The trend frame 50, and therefore the tabletop 8, can be rotated into either reverse trend or trend by driving either each of the first and second actuators 54, 56 individually or both of the first and second actuators 54, 56 at the same time in opposite directions, depending upon the initial position of the trend axis T-T relative to the column 6. Operating two trend actuators together has the benefit of increasing the speed of trend movement as a result of a reduction in the distance that each trend actuator, namely the first and second actuators 54, 56, has to drive for any given change in trend or reverse trend angle.

In particular, the trend frame 50 can be raised or lowered, with the trend frame at any given orientation, for example level, i.e. horizontally oriented. This function is achieved by driving both of the first and second actuators 54, 56 simultaneously in the same direction, i.e. extending to raise elongate element 78 or retracting to lower elongate element 78, and at the same translational rate. The position of the trend axis T-T is correspondingly raised or lowered, which raises or lowers the brace mechanism 108 coupled to the pair of linear guide mechanisms 102 fitted to the outer column element 30 of the extendable column 6.

The trend frame 50 can therefore be raised or lowered relative to the outer column element 30 of the column 6, and, independently therefrom, the outer column element 30 can be raised or lowered relative to the base 4 of the surgical table 2 since the column 6 is extendable. The cumulative effect is that the vertical motion of the trend frame 50 relative to the base 4 of the surgical table 2 can combine the vertical motion of the trend frame 50 relative to the column 6 in an additive sense with vertical motion of the extendable column 6.

The total range of vertical motion of the trend frame 50 relative to the base 4 of the surgical table 2 is very high, and higher than known surgical tables. Consequently, the lowermost position of the tabletop 8 is very low, and the highest position is very high, as compared to known surgical tables.

In addition, the trend frame 50 can be raised or lowered so as to orient the trend frame at any given orientation relative to the horizontal, i.e. to a reverse trend orientation (with the lower torso section 16 coupled to the trend frame 50 inclined so that the head section 12 of the tabletop 8 is above the leg sections 18 of the tabletop 8) or to a trend orientation (with the lower torso section 16 coupled to the trend frame 50 inclined so that the head section 12 of the tabletop 8 is below the leg sections 18 of the tabletop 8). This function is achieved, depending upon the start position of the tabletop 8 and the trend frame 50, by driving one or both of the first and second actuators 54, 56.

Figure 7A:
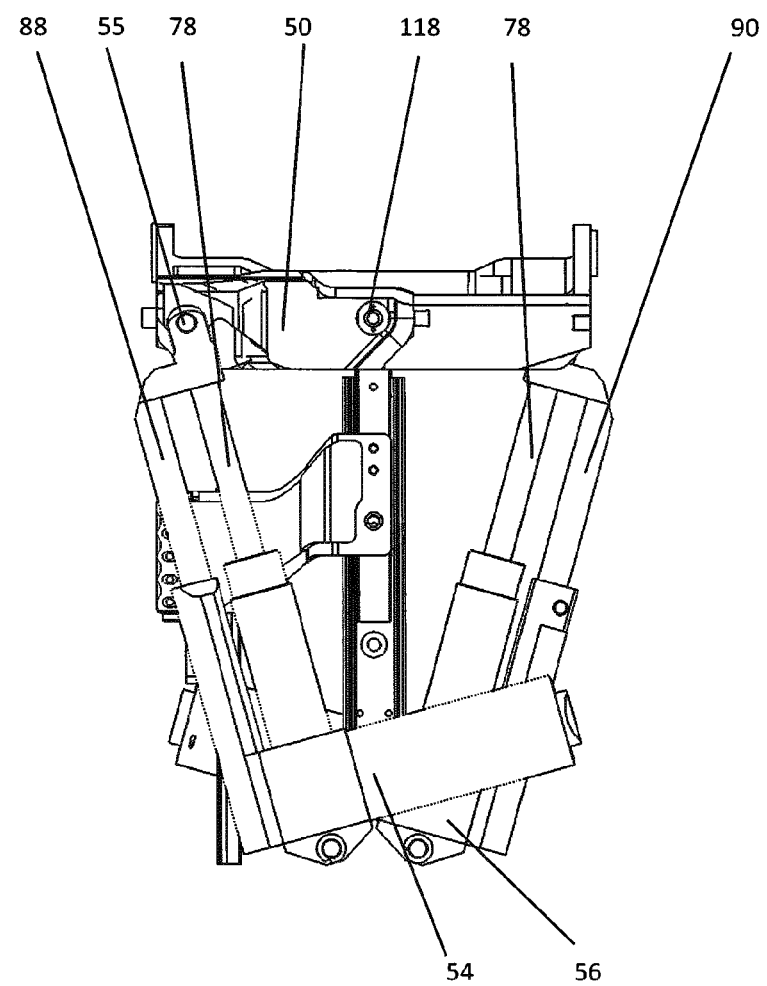
FIGS. 7a, 7b and 7c are schematic side views of the column and the mechanism for controlling the trend angle and height of the trend frame of the surgical table of FIG. 1, showing the trend axis at an intermediate height and the trend frame respectively in a horizontal configuration, in a reverse trend configuration and in a trend configuration.
Figure 7B:
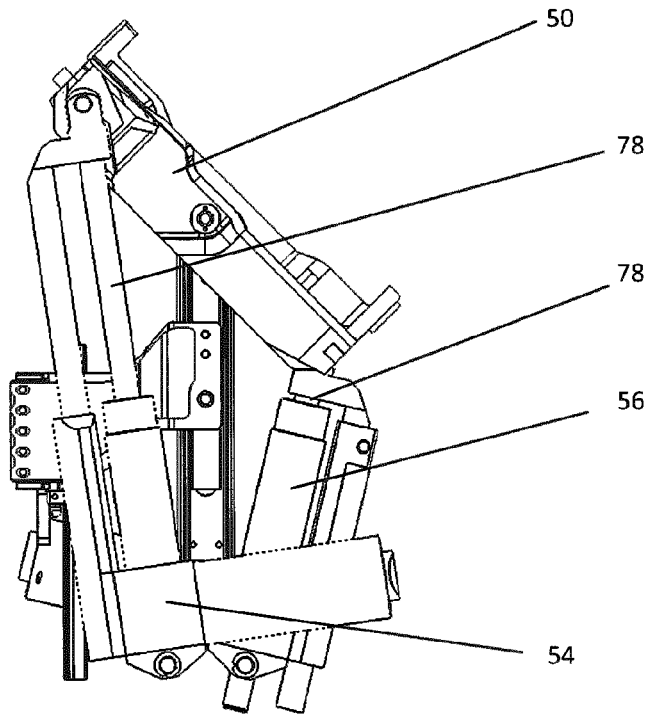
Figure 7C:
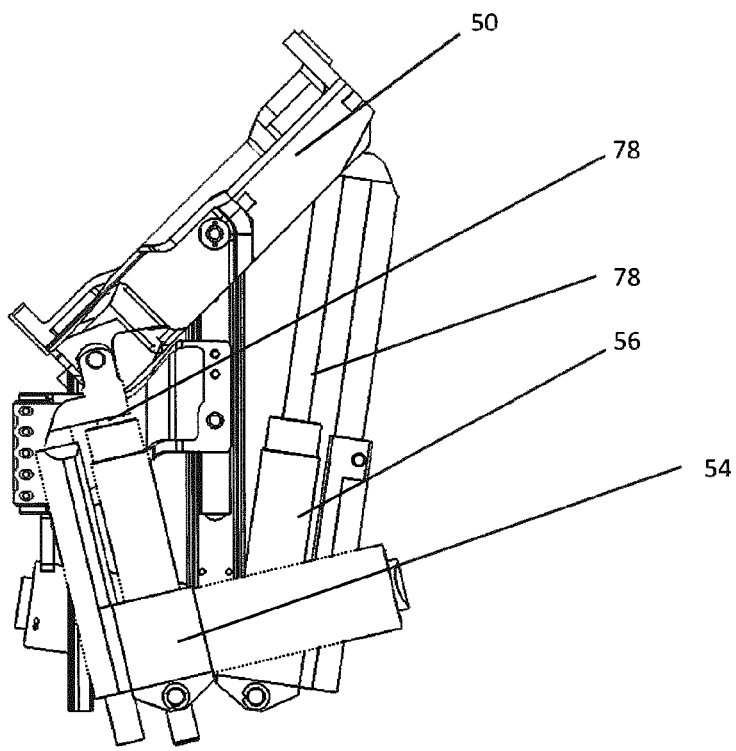

For example, if the tabletop 8 and the trend frame 50 are initially level relative to the horizontal, as shown in FIG. 7*a*, the first and second actuators 54, 56 can be driven simultaneously in opposite directions, i.e. extending to raise one elongate element 78 and retracting to lower the other elongate element 78, and at the same translational rate, which may be termed a symmetric mode to achieve a reverse trend position as shown in FIG. 7*b* or a trend position as shown in FIG. 7*c*.

When the first and second actuators 54, 56 are driven simultaneously in opposite directions, the vertical position of the trend axis T-T is stationary, and the trend frame 50 rotates about the trend axis T-T. Driving the first and second actuators 54, 56 simultaneously in opposite directions, provides the advantage that very fast trend, or reverse trend, movement can be achieved. The enhanced speed is achieved since both sides of the trend frame 50 are raised or lowered relative to the trend axis T-T, and so the translational distance that each of the first and second actuators 54, 56 need to extend or retract is minimised for a given change in trend angle. The reduced actuator driving distance for a given change in trend angle permits faster trend movement.

It is very desirable for the surgical table to reduce the time period to achieve a trend position, for example from a horizontal position, since in many surgical procedures it may be necessary in an emergency to put the surgical table into a trend position to maximise blood flow to the patient's head as quickly as possible.

Alternatively, the trend frame 50 can be raised or lowered so as to orient the trend frame at any given orientation relative to the horizontal, i.e. to a reverse trend orientation or to a trend orientation by driving only one of the first and second actuators 54, 56, or by driving both of the first and second actuators 54, 56 in an asymmetric mode, i.e. the first and second actuators 54, 56 are driven in other than an opposite and simultaneous manner.

Figure 8A:
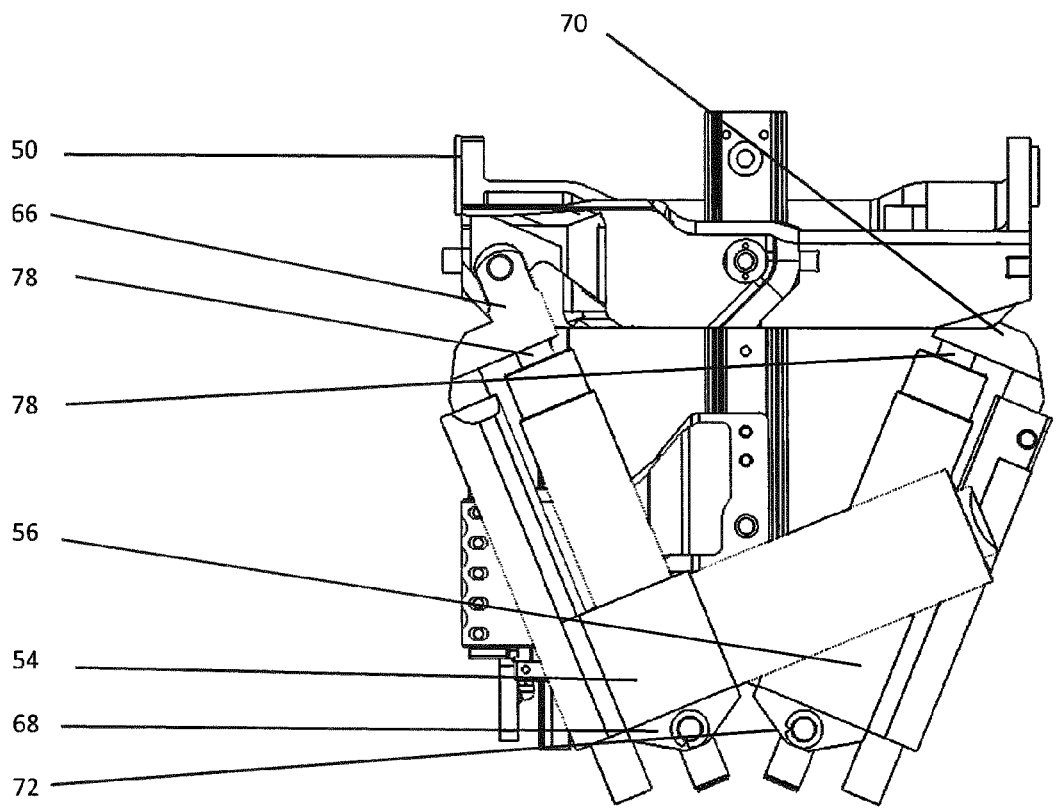
FIGS. 8a, 8b and 8c are schematic side views of the column and the mechanism for controlling the trend angle and height of the trend frame of the surgical table of FIG. 1, showing the trend axis at a minimum height and the trend frame respectively in a horizontal configuration, in a reverse trend configuration and in a trend configuration.
Figure 8B:
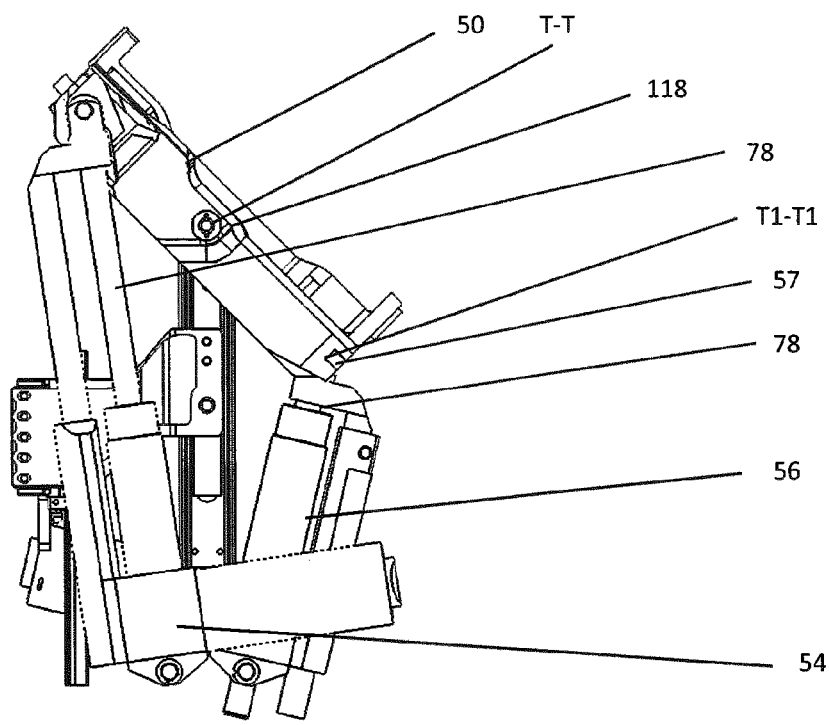

For example if the tabletop 8 and the trend frame 50 are initially level relative to the horizontal, and the tabletop 8 is at a minimum height, as shown in FIG. 8*a*, the second actuator 56 can be undriven so that its elongate element 78 is stationary, and remains retracted, and the first actuator 54 can be driven in an upward direction, i.e. extending to raise its elongate element 78, as shown in FIG. 8*b*. The pivot coupling 57 of the second actuator 56 thereby defines the effective trend axis T1-T1 for the trend frame 50. The central trend axis T-T is correspondingly raised relative to the effective trend axis T1-T1 and the rotational motion of the trend frame 50 is about the effective trend axis T1-T1 rather than the central trend axis T-T.

Figure 8C:
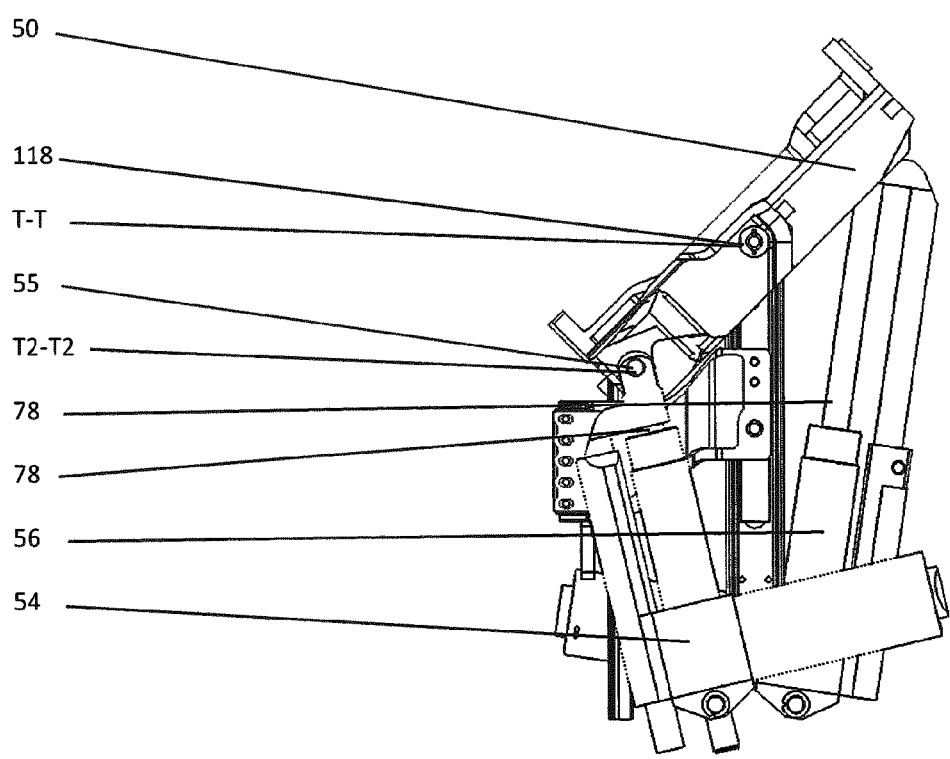

Conversely, as shown in FIG. 8*c* if the first actuator 54 is undriven, and remains retracted, and the second actuator 56 is driven to extend the elongate element 78, the pivot coupling 55 of the first actuator 54 thereby defines a second effective trend axis T2-T2 for the trend frame 50. Furthermore, the trend or reverse trend position can be achieved by lowering one of the first and second actuators 54, 56 and keeping stationary the other of the first and second actuators 54, 56.

It may be seen that by providing a mounting for the central trend axis T-T which can move vertically, by vertical motion of the opposite trend pivots 118 which are mounted to the linear guide mechanisms 102, and by providing that the first and second actuators 54, 56 can be driven entirely independently, the effective trend axis, i.e. the axis that the trend frame 50 actually pivots about during a trend or reverse trend motion, can be located at one of three positions, namely the trend pivots 118 (defining trend axis T-T), the pivot coupling 57 of the second actuator 56 (defining trend axis T1-T1) or the pivot coupling 55 of the first actuator 54 (defining trend axis T2-T2).

Figure 9:
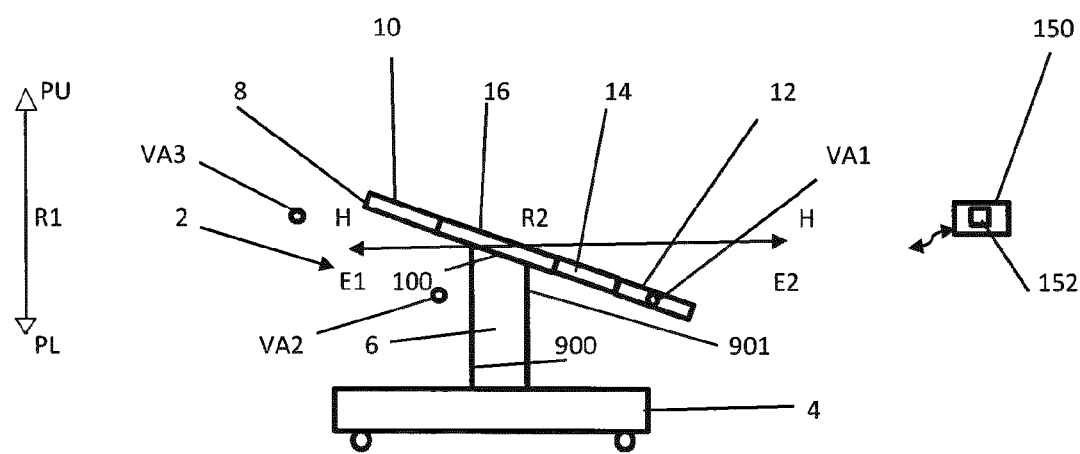
FIG. 9 is a schematic side view of the surgical table of FIG. 1 in a trend position.

A control mechanism 150, illustrated schematically in FIGS. 1 and 9 as a wireless control, is provided to cause the height and location of the effective trend axis to be variable. The control mechanism 150 is arranged to be operable to control the actuator mechanism 52 to cause the effective trend axis to be movable between first and second configurations. In the first configuration the effective trend axis is aligned with a physical axis of one of the first and second pivot couplings 55, 57. In the second configuration the effective trend axis is a virtual axis located away from the physical axis of both of the first and second pivot couplings 55, 57.

The control mechanism 150 is arranged to be operable to control the actuator mechanism 52 to cause the effective trend axis to be movable between first, second and third configurations. In the first configuration the effective trend axis is aligned with a physical axis of one of the first and second pivot couplings 55, 57, in the third configuration the effective trend axis is aligned with a physical axis of the other of the first and second pivot couplings 55, 57, and in the second configuration the effective trend axis is a virtual axis located between the physical axes of both of the first and second pivot couplings 55, 57.

The control mechanism 150 comprises a speed and direction controller 152 for controlling the speed and movement direction of the first and second actuators 54, 56. The controller 152 is arranged independently to control the first and second actuators 54, 56 and independently to control the speed and movement direction of each of the first and second actuators 54, 56.

In particular, the controller 152 is arranged independently to control the first and second actuators 54, 56 in any one of four operational modes, herein called first, second, third and fourth operational modes, which are described with reference to FIGS. 10*a* to 10*d*.

Figure 10A:
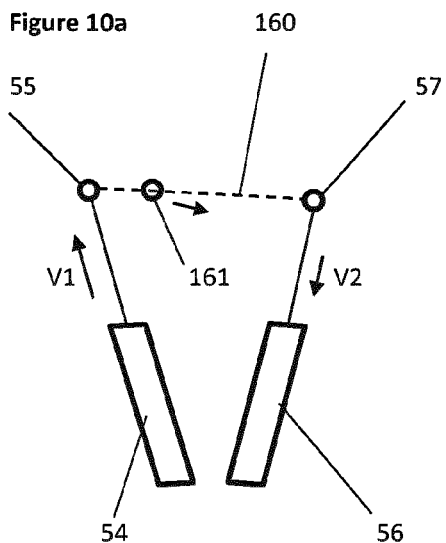
FIGS. 10a to 10d schematically illustrate four operational modes of the trend control mechanism.

In the first operational mode, shown in FIG. 10*a*, the first and second actuators 54, 56 are driven at different speeds in opposite movement directions. In the first operational mode, the effective trend axis 161 is translated along a first line 160 extending between the first and second pivot couplings 55, 57. The first line 160 moves together with the movement of the first and second actuators 54, 56 in the first operational mode.

Figure 10B:
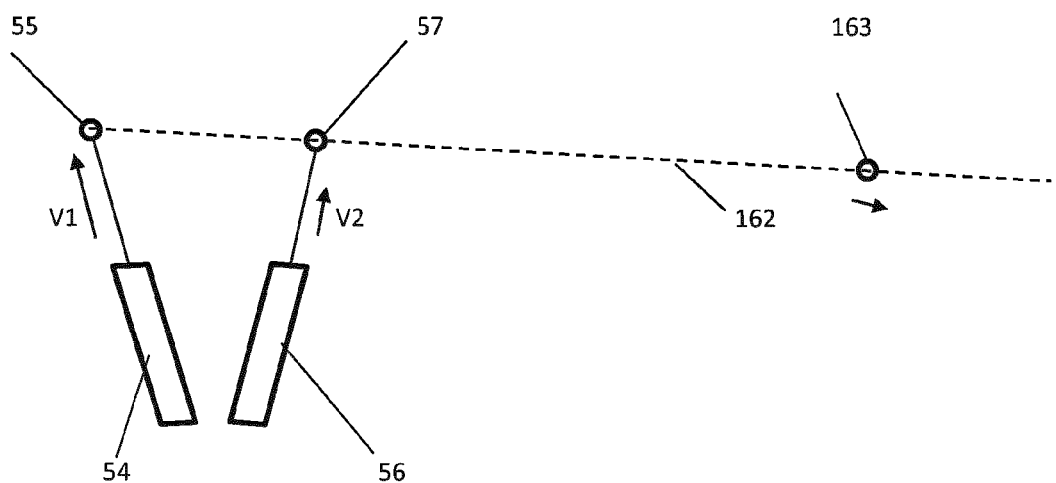

In the second operational mode, shown in FIG. 10*b*, the first and second actuators 54, 56 are driven at different speeds in the same movement direction. In the second operational mode the effective trend axis 163 is translated along a second line 162 extending laterally beyond one of the first and second pivot couplings 55, 57. The second line 162 moves together with the movement of the first and second actuators 54, 56 in the second operational mode.

Figure 10C:
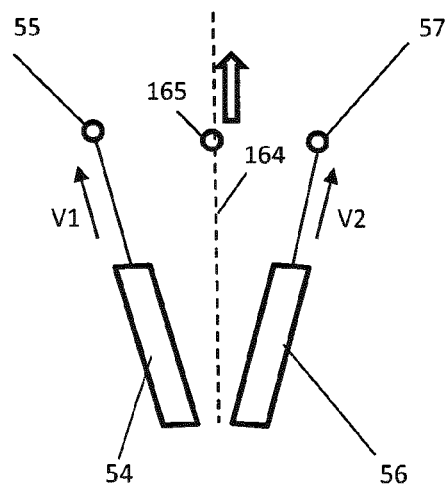

In the third operational mode, shown in FIG. 10*c*, the first and second actuators 54, 56 are driven at the same speed in the same movement direction and the effective trend axis 165 is raised or lowered along a third line 164 extending vertically.

Figure 10D:
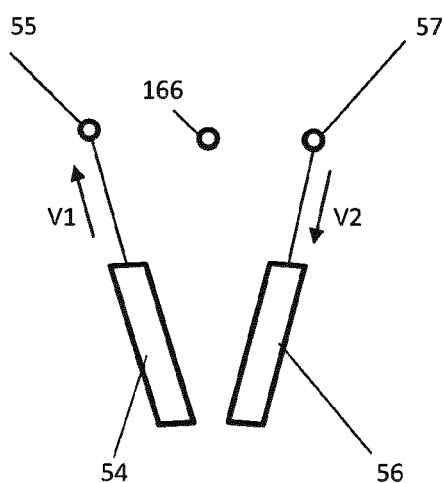

In the fourth operational mode, shown in FIG. 10*d*, the first and second actuators 54, 56 are driven at the same speed in opposite movement directions and the effective trend axis 166 is static. The effective trend axis 166 is located between the first and second pivot couplings 55, 57.

There may be additional operational modes in which only one of the first and second actuators 54, 56 is driven and the other of the first and second actuators 54, 56 is undriven. These modes would cause the effective trend axis to be static and located at the static first or second pivot coupling 55, 57.

If both of the first and second actuators 54, 56 are driven simultaneously but at different speeds, then the effective trend axis, i.e. the axis that the trend frame 50 actually pivots about during a trend or reverse trend motion, can be virtually located at any position between the pivot coupling 55 of the first actuator 54 (T2-T2) and the pivot coupling 57 of the second actuator 56 (T1-T1). For example if the first actuator 54 is raised at a velocity of X m/s and the second actuator 56 is lowered at a velocity of −2× m/s, the effective trend axis is virtually located at a position between the trend pivots 118 and the pivot coupling 57 of the second actuator 56 (T1-T1).

It may therefore be seen that by varying the relative velocity and direction of motion of the first and second actuators 54, 56, the location of the effective trend axis, which may be at a physical pivot or at a virtual pivot, can be at any position from, and including, the physical pivot coupling 55 of the first actuator 54 (defining trend axis T2-T2) to, and including, the physical pivot coupling 57 of the second actuator 56 (defining trend axis T1-T1), and may be at the physical trend pivots 118 (defining trend axis T-T), or any position therebetween as a virtual pivot.

Thus, the control mechanism 150 can cause the vertical location of the effective trend axis to be variable within a first dimensional range and can cause the horizontal location of the effective trend axis in a direction orthogonal to the transverse axis to be variable within a second dimensional range.

By providing an ability to vary the location of the effective trend axis across the length of the trend frame 50, i.e. in a direction along the central axis C-C, the relationship between the trend/reverse trend orientations and height of the tabletop 8 has a very high freedom of movement.

For example, if the tabletop 8 is initially in a medium height horizontal position, the tabletop 8 can be driven to a trend position very quickly by simultaneously driving the first and second actuators 54, 56 in opposite directions, which lowers the head and raises the feet of the patient, and the effective trend axis would be at the physical trend pivots 118 (defining trend axis T-T).

However, if the tabletop 8 is initially in a low height horizontal position, it may not be possible further to lower the head to a trend position simply by rotating the trend frame 50 about the central trend axis T-T defined by the trend pivots 118, because the head section 12 may already be at its minimum height.

Therefore, the tabletop 8 can be driven to a trend position quickly by only driving the first actuator 54 and by keeping the second actuator 56 stationary. This inclines the entire tabletop 8, and raises the feet of the patient, but keeps the head of the patient at substantially the same height relative to the floor. The effective trend axis would be at the physical pivot coupling 57 of the second actuator 56 (defining trend axis T1-T1).

This provides the advantage that the tabletop 8 can quickly attain a trend position from a low initial height merely by tilting the tabletop about a non-central trend axis and without requiring the entire tabletop to be raised in height; in contrast, in known surgical tables it would be necessary to raise the entire tabletop relative to the floor to achieve a trend position from an initial low tabletop starting position, which would delay and slow down the trend operation.

Conversely, if the tabletop 8 is initially in a high height horizontal position, and it is possible further to lower the head towards the floor into a trend position, the trend frame 50 may be rotated about an effective trend axis at the physical pivot coupling 55 of the first actuator 54 (defining trend axis T2-T2), because the leg sections 18 may already be at their maximum height. Therefore, the tabletop 8 can be driven to a trend position quickly by only driving the second actuator 56 and by keeping the first actuator 54 stationary.

It should be clear that any non-symmetric simultaneous motion of the first and second actuators 54, 56 can locate the effective trend axis at any physical or virtual pivot in the distance extending from the physical pivot coupling 55 of the first actuator 54 to the physical pivot coupling 57 of the second actuator 56, which further enhances the versatility, with regard to height and speed, of achieving the trend/reverse trend orientations of the tabletop 8.

Of course, this versatility is further enhanced by providing the lifting and orienting mechanism for the trend frame 50 on the extendable column 6 which can be independently driven from the first and second actuators 54, 56 which drive the trend frame 50.

Consequently, the versatility, with regard to height and speed, of achieving the trend/reverse trend orientations of the tabletop 8 are significantly higher than as compared to known surgical tables.

Furthermore, as shown in FIG. 9, the control mechanism 150, including controller 152, is arranged to be operable to control the actuator mechanism 52, and optionally the column 6 and the linear guide mechanisms 102, described above with reference to FIGS. 2 to 8c, to cause (i) the height of the trend axis to be variable within a first dimensional range R1 having a lowermost position PL, at which the trend axis extends through the column 6, and an uppermost position PU, at which the trend axis is spaced at spacing height above the upper end 100 of the column 6, and, simultaneously and/or independently (ii) the location of the trend axis, in a lateral direction H-H orthogonal to the trend axis T-T, to be translationally variable within a second dimensional range R2 extending between first and second end positions E1, E2 which are laterally spaced outwardly from respective opposite first and second sides 900, 901 of the column 6.

In particular, as described above with reference to FIGS. 8 and 10, the trend axis T-T is movable in a first configuration or a second configuration. In the first configuration the trend axis T-T is aligned with a physical axis extending through the movable framework 50 and about which the actuator mechanism 52 is coupled to the movable framework 50, and in the second configuration the trend axis T-T is a virtual axis located away from the physical axis. As described above, the physical axis may be axis T1-T1 or axis T2-T2.

In the second configuration, the virtual axis can be located at a position within a two-dimensional area, in a plane orthogonal to the trend axis T-T and containing the central longitudinal axis C-C of the tabletop 8, defined by the first dimensional range R1 and the second dimensional range R2.

As shown for example in FIG. 9, the virtual axis VA1 may be a transverse axis extending through the head section 12. The control mechanism 150 may control the actuator mechanism 52, and optionally the column 6 and the linear guide mechanisms 102, described above with reference to FIGS. 2 to 8, to cause the entire tabletop to be rotated in a trend or reverse trend motion about the virtual axis VA1. In other words, in this example the tabletop 8 carrying the patient can be rotated in a trend or reverse trend motion about the virtual axis VA1 which is located in the vicinity of the head of the patient. This virtual axis VA1 could be located at any lateral position within range R2 relative to the operating table 2. Range R2 can even extend beyond the tabletop 8. In further examples, the virtual axis could be located at points VA2 or VA3 as shown in FIG. 9.

This provides a significantly enhanced versatility to the trend function of the operating table 2 as compared to known operating tables.

It may therefore be seen that the preferred embodiments of the present invention can provide a highly versatile column and trend mechanism which can provide a wide range of trend angles and a wide range of tabletop heights in a compact unit having a small footprint.

In the preferred embodiments of the present invention, the trend frame actuators can be driven synchronously with column height adjustment.

The preferred embodiments of the present invention can provide a minimum tabletop height (excluding mattress thickness) of no greater than 510 mm from the floor surface.

The preferred embodiments of the present invention can provide a minimum column height of less than 380 mm from the base of the surgical table. The trend pivot is below the top of the column and is less than 290 mm from the base of the surgical table. A low minimum tabletop height is achieved because component or assemblies above the column can be lowered directly onto the column without the need for clearance above the column. In contrast, in a conventional surgical table design with fixed trend pivot positions, clearance above the column is required to allow for trend and tilt movement. By providing an adjustment of the position of the trend pivot relative to the column height, the height adjustment of the tabletop can be increased compared to the height adjustment of only the column, while still facilitating a low minimum tabletop height.

The contracted height to stroke ratio is maximised by using through-spindle electric actuators, in which the screw can be driven through the gearbox, in the preferred embodiments of the invention. This in turn provides that a low table height and large trend angles can be achieved. The use of such actuators provides that the gearbox does not add to the height of the actuator compared to conventional actuators that have the screw connected directly above the gearbox.

The preferred embodiments of the present invention can also provide a tabletop height adjustment range of up to 645 mm.

The preferred embodiments of the present invention can also provide a vertical lifting capacity of 550 kg and an offset loading moment capacity of at least 1600 Nm.

The preferred embodiments of the present invention can provide large, steep trend angles of at least 45 degrees, typically up to 90° from endpoints of +45° to −45°, at low column heights while still providing sufficient clearance for table coverings and ancillary components around the column. The trend axis, and trend frame, can be raised above the column to provide a high level of clearance from the column to permit large trend angles even at low tabletop heights.

The preferred embodiments of the present invention can provide two actuators which support offset loads on the trend frame, which improves the dynamic lifting performance and offset loading capacity at a given trend angle. Furthermore, more compact and less powerful actuators can be employed to achieve a high dynamic performance.

Various modifications can be made to the above-described embodiments without departing from the scope of the present invention, which is defined by the claims.

The invention claimed is:

1. A surgical table comprising:
a base for standing on a floor;
a column of adjustable height mounted on and extending from the base; the
a tabletop providing a patient support surface;
a movable framework comprising a rigid trend frame mounted between the tabletop and the column for enabling at least a part of the tabletop to be rotatable about a trend axis, the trend axis extending in a transverse direction across the tabletop; and
an actuator mechanism coupled to the rigid trend frame of the movable framework and arranged to raise and lower the rigid trend frame of the movable framework relative to the column and to raise and lower the trend axis and to rotate the rigid trend frame of the movable framework about the trend axis, the actuator mechanism comprising first and second actuators, the first actuator having an upper first end connected to a first portion of the rigid trend frame of the movable framework by a first pivot coupling between the actuator mechanism and the rigid trend frame of the movable framework, and the second actuator having an upper first end connected to a second portion of the rigid trend frame of the movable framework by a second pivot coupling between the actuator mechanism and the rigid trend frame of the movable framework, the first and second portions being mutually spaced a fixed distance and located on opposite sides of the trend axis, and first and second actuators each having a respective lower second end which is pivotally coupled to the column, wherein the first actuator is arranged to raise or lower the upper first end of the first actuator and thereby rotate the first portion of the rigid trend frame about the trend axis, and the second actuator is arranged to raise or lower the upper first end of the second actuator and thereby rotate the second portion of the rigid trend frame about the trend axis;
a control mechanism arranged to control the actuator mechanism to cause (i) the height of the trend axis to be translationally variable within a first dimensional range having a lowermost position, at which the trend axis extends through the column, and an uppermost position, at which the trend axis is above the upper end of the column and the trend axis is spaced at a spacing height above the upper end of the column, and, simultaneously and/or independently, (ii) the location of the trend axis in a lateral direction orthogonal to the trend axis to be translationally variable within a second dimensional range extending between first and second end positions; and
at least one linear guide mechanism extending along at least a portion of the length of the column, the linear guide mechanism comprising a first part coupled to the column and a second part pivotally coupled to the rigid trend frame of the movable framework at a trend pivot, the trend pivot being located between the first and second portions of the rigid trend frame of the movable framework, the first and second parts being relatively movable along a linear axis of the linear guide mechanism to enable the rigid trend frame of the movable framework to be translated along the linear axis by relative movement of the first and second parts.

2. A surgical table according to claim 1, wherein the control mechanism is arranged to control the actuator mechanism to cause the trend axis to be movable between first and second configurations, wherein in the first configuration the trend axis is aligned with a physical axis of one of the first and second pivot couplings, and in the second configuration the trend axis is a virtual axis located away from the physical axis of both of the first and second pivot couplings.

3. A surgical table according to claim 1, wherein the control mechanism is arranged to control the actuator mechanism to cause the trend axis to be movable between first, second and third configurations, wherein in the first configuration the trend axis is aligned with a physical axis of the first pivot coupling, in the third configuration the trend axis is aligned with a physical axis of the second pivot coupling, and in the second configuration the trend axis is a virtual axis located between the physical axes of both of the first and second pivot couplings.

4. A surgical table according to claim 1, wherein the control mechanism comprises a speed and direction controller for controlling the speed and movement direction of the first and second actuators.

5. A surgical table according to claim 4, wherein the controller is arranged to be operable, for achieving translational motion of the trend axis over at least one dimensional range, independently to control the first and second actuators and/or independently to control the speed and movement direction of each of the first and second actuators.

6. A surgical table according to claim 4, wherein the controller is arranged to be operable to control the first and second actuators in a first operational mode in which the first and second actuators are driven at different speeds in opposite movement directions.

7. A surgical table according to claim 6, wherein in the first operational mode the trend axis is translated along a first line extending between the first and second pivot couplings.

8. A surgical table according to claim 7, wherein the first line extending between the first and second pivot couplings moves together with the movement of the first and second actuators in the first operational mode.

9. A surgical table according to claim 4, wherein the controller is arranged to be operable to control the first and second actuators in a second operational mode in which the first and second actuators are driven at different speeds in the same movement direction.

10. A surgical table according to claim 9, wherein in the second operational mode the trend axis is translated along a second line extending laterally beyond one of the first and second pivot couplings.

11. A surgical table according to claim 10, wherein the second line moves together with the movement of the first and second actuators in the second operational mode.

12. A surgical table according to claim 4, wherein the controller is arranged to be operable to control the first and second actuators in a third operational mode in which the first and second actuators are driven at the same speed in the same movement direction.

13. A surgical table according to claim 12, wherein in the third operational mode the trend axis is raised or lowered along a third line extending vertically.

14. A surgical table according to claim 4, wherein the controller is arranged to be operable to control the first and second actuators in a fourth operational mode in which the first and second actuators are driven at the same speed in opposite movement directions.

15. A surgical table according to claim 14, wherein in the fourth operational mode the trend axis is static.

16. A surgical table according to claim 1, wherein the first and second portions are located on opposite sides of a central axis orthogonal to the trend axis and extending through the rigid trend frame of the movable framework.

17. A surgical table according to claim 1, wherein the rigid trend frame of the movable framework is substantially rectangular and the first and second portions are located at diagonally opposite corners of the rigid trend frame of the movable framework.

18. A surgical table according to claim 1, wherein the first and second actuators are the only actuators coupled between the column and the rigid trend frame of the movable framework for causing movement of the rigid trend frame of the movable framework relative to the column.

19. A surgical table according to claim 1, wherein the first and second actuators are each inclined at a respective acute angle in opposite directions from a plane including a longitudinal axis of the column and the trend axis so that each of the first and second actuators is oriented upwardly and outwardly away from the column.

20. A surgical table according to claim 1, wherein the second end of each of the first and second actuators is coupled to an external surface of the column.

21. A surgical table according to claim 1, wherein the first and second actuators each comprise an electrical linear actuator.

22. A surgical table according to claim 1, wherein the first and second actuators each comprise an elongate element having an upper end connected by a pivot joint to the rigid trend frame of the movable framework and a drive assembly coupled to a lower portion of the elongate element for extending, or retracting, the elongate element so as respectively to raise, or lower, the respective first and second portions of the rigid trend frame of the movable framework.

23. A surgical table according to claim 22, wherein the elongate element comprises a leadscrew and the drive assembly is adapted to rotate the leadscrew to extend, or retract, the leadscrew so as respectively to raise, or lower, the respective first and second portions of the rigid trend frame of the movable framework.

24. A surgical table according to claim 23, wherein the leadscrew extends entirely through the drive assembly so that a lower end of the leadscrew is below the drive assembly at least when the leadscrew is retracted.

25. A surgical table according to claim 23, wherein the elongate element is linear and is inclined at an acute angle from the plane including a longitudinal axis of the column and the trend axis so that the upper end is oriented further from the plane than the lower portion.

26. A surgical table according to claim 25, wherein the elongate elements of the first and second actuators are oriented in opposite directions from the plane.

27. A surgical table according to claim 25, wherein the second end of each of the first and second actuators is pivotally coupled to the column and the acute angle of inclination of each elongate element from the plane decreases as the extension of the elongate element increases.

28. A surgical table according to claim 1, wherein the first pivot coupling has a first pivot axis, and the second pivot coupling has a second pivot axis, and wherein the first and second pivot axes are parallel and mutually spaced.

29. A surgical table according to claim 28, wherein and the first and second end positions respectively correspond to the first and second pivot axes or wherein the first and second end positions are respectively laterally spaced outwardly from the first and second pivot axes or wherein the first and second end positions are laterally spaced outwardly from respective opposite first and second sides of the column.

30. A surgical table according to claim 1, wherein the movable framework defines an internal opening which is larger than the upper end of the column and the actuator mechanism is capable of lowering the movable framework relative to the column to a lowermost position in which the movable framework is below the upper end of the column and surrounds the column and the trend axis is below the upper end of the column.

31. A surgical table according to claim 1, wherein the actuator mechanism is capable of raising the movable framework relative to the column to an uppermost position in which the movable framework is above, or at least partly above, the upper end of the column.

* * * * *

UNITED STATES PATENT AND TRADEMARK OFFICE
CERTIFICATE OF CORRECTION

PATENT NO. : 11,602,475 B2
APPLICATION NO. : 16/642966
DATED : March 14, 2023
INVENTOR(S) : Matthew Clayton and John Trewin It is certified that error appears in the above-identified patent and that said Letters Patent is hereby corrected as shown below:

In the Claims

Column 14, Line 9 (Claim 1) remove "the" after the ";".

Signed and Sealed this
Ninth Day of May, 2023

Katherine Kelly Vidal
*Director of the United States Patent and Trademark Office*